United States Patent [19]
Goto et al.

[11] Patent Number: 5,505,898
[45] Date of Patent: Apr. 9, 1996

[54] PLASTIC PIPE AND MANUFACTURING METHOD THEREOF

[75] Inventors: Yuichiro Goto; Takatomo Harada; Hideki Kasa; Takashi Tago, all of Sakai, Japan

[73] Assignee: Kubota Corporation, Osaka, Japan

[21] Appl. No.: 108,681

[22] PCT Filed: Dec. 28, 1992

[86] PCT No.: PCT/JP92/01733

§ 371 Date: Dec. 17, 1993

§ 102(e) Date: Dec. 17, 1993

[87] PCT Pub. No.: WO93/14342

PCT Pub. Date: Jul. 22, 1993

[30] Foreign Application Priority Data

Jan. 6, 1992 [JP] Japan .............................. 4-86

[51] Int. Cl.$^6$ .................................................. B29C 39/00
[52] U.S. Cl. .......................... 264/275; 264/279; 285/21 A; 219/535; 219/544
[58] Field of Search ................................ 285/21; 29/613; 264/275, 279; 219/535, 544

[56] References Cited

U.S. PATENT DOCUMENTS

| | | | |
|---|---|---|---|
| 2,986,411 | 5/1961 | Anderson | 285/291 |
| 4,076,282 | 2/1978 | Scott et al. | 285/423 X |
| 4,124,422 | 11/1978 | Kusano | 285/260 X |
| 4,135,961 | 1/1979 | Yoshizawa et al. | 265/423 X |
| 4,150,087 | 4/1979 | Putter et al. | 285/423 X |
| 4,258,935 | 3/1981 | Rodrigo | 285/21 |
| 4,508,368 | 4/1985 | Blumenkranz | 285/21 |
| 4,630,846 | 12/1986 | Nishino et al. | 285/21 |
| 4,714,578 | 12/1987 | Cagle et al. | 285/423 X |
| 4,770,442 | 9/1988 | Sichier | 285/21 |
| 4,797,993 | 1/1989 | Kenworthy et al. | 285/21 X |
| 4,852,914 | 8/1989 | Lyall | 285/21 |
| 4,865,674 | 9/1989 | Durkin | 219/544 X |
| 4,906,313 | 3/1990 | Hill | 285/21 X |
| 4,927,183 | 5/1990 | Steinmetz | 285/21 |
| 5,057,263 | 10/1991 | Bengtsson | 285/423 X |
| 5,125,690 | 6/1992 | Taylor et al. | 285/21 |

Primary Examiner—Dave W. Arola
Attorney, Agent, or Firm—Hoffmann & Baron

[57] ABSTRACT

A plastic pipe (10) includes a pipe body (12), and, at an end of the pipe body (12), there is formed a socket which is provided in the inner surface or in the vicinity of the inner surface thereof with a heat generating unit (18). In coupling, an outer peripheral surface of an end of a pipe (28) to be coupled is scraped by a scraper or the like, and the end is inserted into the socket. Then, an electric current is supplied to the heat generating unit (18) such that a heat is generated by the same. Then, synthetic resin of the coupling surfaces of the pipe (28) and the socket and synthetic resin disposed thereabout are fused, so that the both members are fusion-coupled to each other.

4 Claims, 12 Drawing Sheets

PLASTIC PIPE AND MANUFACTURING METHOD THEREOF

TECHNICAL FIELD

The present invention relates to a plastic pipe and a manufacturing method thereof. More specifically, the present invention relates to a plastic pipe used for electro-fusion coupling, and a manufacturing method thereof.

PRIOR ART

In the past, in order to couple two plastic pipes to each other by electro-fusion coupling, an electro-fusion fitting which is shown in FIG. 18 and formed by injection molding was utilized. The electro-fusion fitting 1 includes an approximately hollow cylinder-like body 2 made of synthetic resin, and an electric heating wire 3 which is wound in a form of a coil is embedded in the vicinity of an inner surface of the body 2, and both ends of the electric heating wire 3 are connected to terminals 4 being formed to be projected from the body 2. Then, in coupling, an outer periphery of each of ends of pipes 5 and 6 to be coupled to each other is scraped by a scraper or the like, and then, the ends are inserted into the body 2, and a heating electric power source (not shown) is connected to the terminals 4 to supply an electric power source to the electric heating wire 3.

In this prior art, since the electro-fusion fitting 1 is formed by injection molding, it was necessary to prepare a dedicated mold for each kind of elbows, tees, and etc., and therefore, there was a problem that a cost is high.

Furthermore, since the outer peripheries of the ends of the pipes 5 and 6 are scraped by the scraper or the like, there was a problem that a workability is poor.

In addition, since the pipes 5 and 6 are respectively inserted into both sockets of the body 2 such that the body 2 and the pipe 5, and the body 2 and the pipe 6 are fused and adhered to each other, respectively, a heat amount necessary for such the fusion coupling becomes large. Accordingly, there was another problem that it is necessary to use a heating electric power source having a larger capacity or to prolong a power supply time.

SUMMARY OF THE INVENTION

Therefore, a principal object of the present invention is to provide a plastic pipe by which a workability can be increased and it is possible to reduce a capacity of an electric power source or shorten a power supply time.

Another object of the present invention is a manufacturing method of a plastic pipe, in which a plastic pipe can be manufactured easily.

The present invention is a plastic pipe to which a member made of first synthetic resin is coupled, comprising: a pipe body made of second synthetic resin, the first and second synthetic resin having first and second fusion temperatures, respectively; a socket formed at an end of the pipe body and for receiving the member; and a heat generating unit provided on or in the vicinity of an inner surface of the socket.

The socket formed at the end of the pipe body is provided with the heat generating unit which includes an electric heating wire, for example. In coupling, an outer periphery of an end of a pipe or the like which is to be coupled to the plastic pipe is scraped by a scraper or the like, and then, the end of the pipe or the like is inserted to the socket. Thereafter, a heating electric power source is connected to terminals connected to both ends of the electric heating wire to supply an electric power to the electric heating wire. Then, the electric heating wire generates a heat due to an ohmic resistance component thereof, so that the inner surface of the socket and the outer periphery of the pipe are fused and adhered or coupled to each other. After a predetermined time elapses, the supply of the electric power to the electric heating wire is stopped, and a coupling portion is cooled.

As the above described heat generating unit provided on the inner surface of the socket or in the vicinity of the inner surface of the socket, a heat generating unit which includes a ferromagnetic alloy member having a Curie temperature equal to the first and second fusion temperatures or higher than the first and second fusion temperatures. In coupling a plastic pipe which is provided with the heat generating unit including the ferromagnetic alloy member is utilized, an outer periphery of an end of the pipe which is to be coupled to the plastic pipe is scraped by a scraper or the like, and the end of the pipe is inserted to the socket, and the ferromagnetic alloy member of the heat generating unit is supplied with a high-frequency current through an electromagnetic induction from a high-frequency electric power source. Then, the ferromagnetic alloy member generates a heat due to a skin current, and a temperature of the ferromagnetic alloy member rises. If the temperature of the ferromagnetic alloy member reaches the Curie temperature, a permeability of the ferromagnetic alloy member becomes small suddenly, and the current flowing a skin layer decreases largely. Therefore, the temperature of the ferromagnetic alloy member does not rise no more. If the temperature of the ferromagnetic alloy member decreases due to heat radiation, the permeability of the ferromagnetic alloy member becomes large, and the ferromagnetic alloy member generates a heat again due to the skin current. Since such an operation is repeated, the temperature of the ferromagnetic alloy member is kept at the predetermined Curie temperature substantially. Accordingly, a coupling portion of the socket and the pipe is heated at or near the Curie temperature of the ferromagnetic alloy member, and fused and coupled to each other.

A manufacturing method of a plastic pipe according to the present invention comprises the following steps: (a) preparing a pipe formed of first synthetic resin; and (b) forming a socket which includes a heat generating unit at at least one end of the pipe, the socket receiving a member to be coupled to the pipe formed of second synthetic resin.

In one embodiment of the present invention, the step (b) specifically includes the following steps: (b-1) preparing a heat generating unit; (b-2) mounting the heat generating unit on a core mold; (b-3) heating the end of the pipe such that the end of the pipe becomes a heated and softened state; (b-4) pressure-inserting the core mold into the end of pipe such that not only a socket is formed at the end of the pipe but also the heat generating unit is incorporated in the socket; and (b-5) releasing the pipe from the core mold. In the embodiment, the core mold which is mounted with the heat generating unit is pressure-inserted into the end of the pipe being heated and softened, whereby the socket is formed at the end of the pipe and the heat generating unit is incorporated in the socket. Therefore, it is possible to simply manufacture a plastic pipe having a socket which is provided with the heat generating unit on an inner surface or in the vicinity of the inner surface of the socket.

In another embodiment according to the present invention the step (b) specifically includes the following steps: (b-11) preparing a heat generating unit; (b-12) preparing a first core mold for defining an inner surface of the pipe and a second core mold for defining an inner surface of a socket; (b-13) mounting the pipe and the heat generating unit on the first and second core molds, respectively; (b-14) forming a cavity around the pipe and the heat generating unit with closing an outer mold; (b-15) injecting third synthetic resin within the cavity so as to the socket which is integrated with the pipe and the heat generating unit can be formed; and (b-16) opening the outer mold to release the pipe from the molds. In the embodiment, the pipe and the heat generating unit are mounted on the first core mold and the second core mold, respectively, and a synthetic resin material is injected around the pipe and the heat generating unit to form a socket. Therefore, it is possible to simply manufacture a plastic pipe having a socket provided with the heat generating unit on inner surface or in the vicinity of the inner surface of the socket.

In a further embodiment according to the present invention the step (b) specifically includes the following steps: (b-21) making an end of the pipe in a heated and softened state; (b-22) inserting collapsible mold capable of increasing a diameter thereof into an end of the pipe; (b-23) increasing the diameter of the collapsible mold to form a socket at the end of the pipe; (b-24) withdrawing the collapsible mold; and (b-25) mounting a heat generating unit in the socket. In the embodiment, the collapsible mold capable of increasing the diameter thereof is inserted into the end of the pipe being in a heated and softened state, and increasing the diameter of the collapsible mold to form the socket having an increased diameter is formed at the end of the pipe, and then, the heat generating unit is provided in the socket. Therefore, it is possible to simply manufacture a plastic pipe having a socket provided with the heat generating unit on an inner surface or in the vicinity of the inner surface of the socket.

The foregoing and other objects, features, aspects and advantages of the present invention will become more apparent from the following detailed description of the present invention when taken in conjunction with the accompanying drawings.

BEST MODE FOR EMBODYING THE INVENTION

Figure 1:
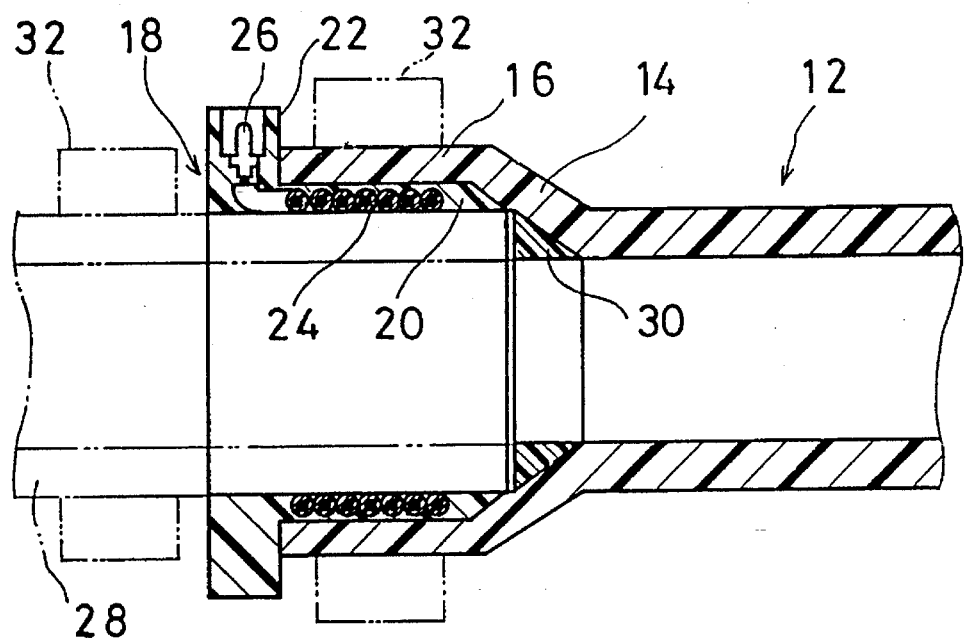
FIG. 1 is a cross-sectional illustrative view showing a plastic pipe that is one embodiment according to the present invention.
Figure 2:
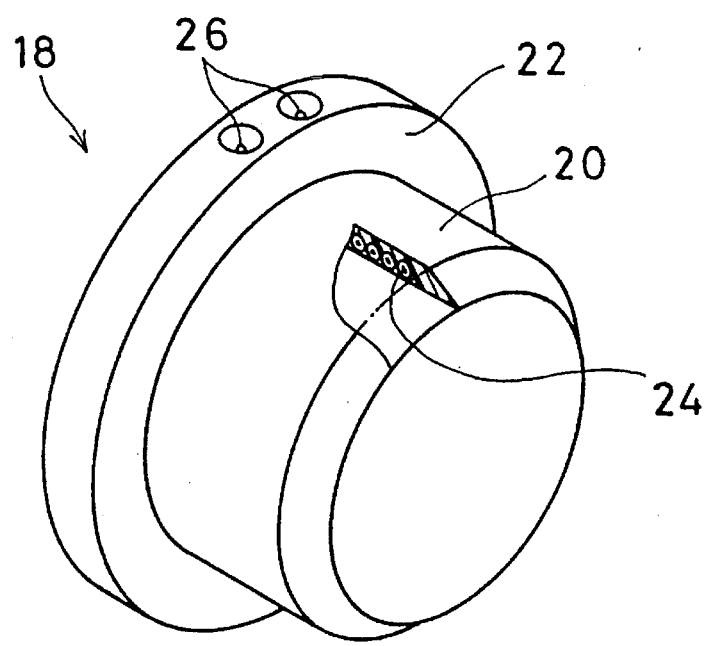
FIG. 2 is a perspective view showing a heat generating unit utilized in FIG. 1 embodiment.

With referring to FIG. 1, a plastic pipe 10 of this embodiment shown includes a pipe body 12 (a straight pipe in this embodiment) made of synthetic resin such as polyethylene, polybutene, and etc. At one end or both ends of the pipe body 12, a portion where a diameter is increased, that is, a socket 16 is formed via an inclined or tapered portion, and an inside of the socket 16, a heat generating unit 18 as shown in FIG. 2 is mounted.

The heat generating unit 18 includes an approximately cylinder-like body 20 having an outer periphery capable of being closely fitted to an inner surface of the socket 16 and made of synthetic resin such as polyethylene, polybutene, and etc., and a flange 22 having a side surface capable of being brought into contact with an end surface of the socket 16 is formed on the outer periphery of an end of the body 20. Furthermore, a coated electric heating wire 24 is embedded inside the body 20 with a double-folded state, and terminals 26 provided on the flange 22 are connected to both ends of the coated electric heating wire 24. In addition, such the heat generating unit 18 is formed in a manner that the coated electric heating wire 24 is wound on an outer periphery of a core mold (not shown) and then synthetic resin such as polyethylene, polybutene, and etc. is injected so as to cover the coated electric heating wire 24.

In order to prevent a step from being formed on an inner surface of a pipeline, a spacer 30 having an approximately triangular configuration in cross-section and capable of being brought into contact with an end surface of a pipe 28 to be coupled to the plastic pipe 10 is attached on an inner surface of the tapered portion 14 in a back of the heat generating unit 18.

In coupling, an outer periphery of the end of the pipe 28 to be coupled is scraped by a scraper or the like, and the end is inserted into the heat generating unit 18, that is, a socket 16 having a larger diameter of the pipe. Then, the socket 16 and the pipe 28 are sandwiched by a cramping tool 32 to be fixed to each other, and a heating electric power source (not shown) is connected to the terminals 26 to supply an electric power to the coated electric heating wire 24. Then, the coated electric heating wire 24 generates a heat due to an ohmic resistance component thereof, and the heat generating unit 18 and the socket 16, and the pipe 28 are fused and adhered to each other, whereby the pipe 10 and the pipe 18 are coupled to each other.

According to the above described embodiment, since an electro-fusion fitting as such the prior art is not required, it is possible to perform electro-fusion coupling with a low cost. Furthermore, since a coupling portion can be made small, it becomes possible to perform the coupling within a small space.

Furthermore, in coupling, only the outer periphery of the end of the pipe 28 may be scraped by the scraper or the like, and therefore, a time and labor for the scraping becomes to be halved in comparison with the prior art, and therefore, it is possible to greatly increase the workability.

Furthermore, it is possible to make an area of the electro-fusion coupling approximately half of that of the prior art, and therefore, the reduction of the capacity of the electric power source as well as the shortening of the power supply time to the coated electric heating wire 24 can be expected.

Furthermore, since the socket 16 can be sandwiched by the clamping tool 32, it is possible to closely fit the pipe 28 to the heat generating unit 18 and the socket 16, and therefore, it is possible to prevent poor electro-fusion coupling from occurring.

Figure 3:
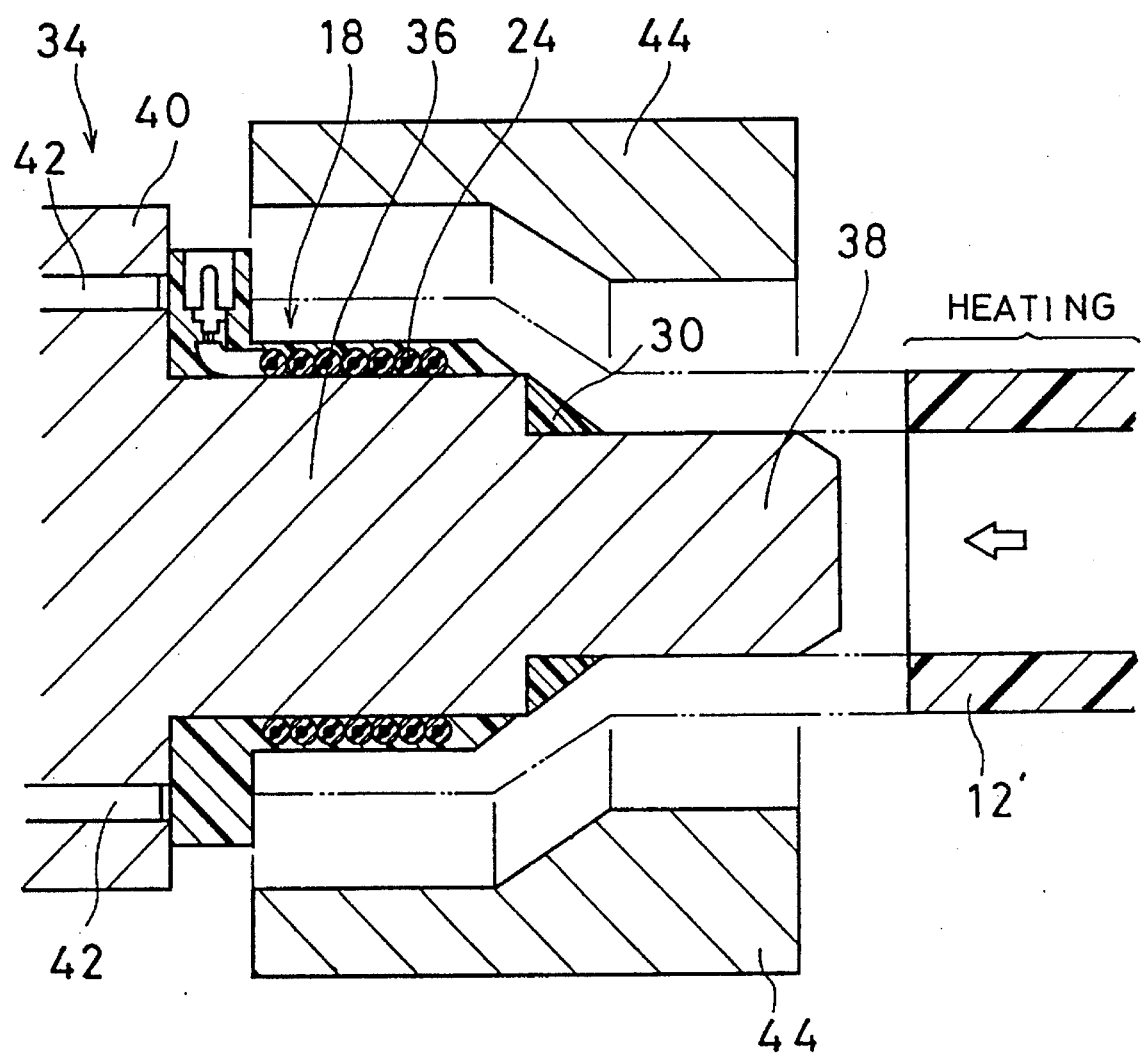
FIG. 3 is an illustrative view showing a manufacturing method of FIG. 1 embodiment.

The above described plastic pipe 10 may be manufactured by utilizing a core mold 34 as shown in FIG. 3. The core mold 34 includes a molding portion 36 having a length approximately equal to a length of the heat generating unit 18, and an outer diameter equal to an inner diameter of the heat generating unit 18, and one end of the molding portion 36 is formed with a guide portion 38 having an outer diameter equal to an inner diameter of the pipe body 12 (FIG. 1), and the other end of the molding portion 36 is formed with a stopper portion 40 for defining a position at which the heat generating unit 18 is to be mounted by being brought into contact with the end surface of the heat generating unit 18. There are arranged projected rods 42 for releasing the mold inside of the stopper 40. Then, above and below the core mold 34, a two-split outer mold 44 is disposed.

In manufacturing the plastic pipe 10, the heat generating unit 18 is mounted on the outer periphery of the molding portion 36 of the core mold 36, and a spacer 30 is attached on an outer periphery of a back end portion of the guide portion 38. Then, a pipe 12' having an end being heated and softened is, as shown by two-dotted line in FIG. 3, capped on the outer peripheries of the spacer 30 and the heat generating unit 18 through the guide portion 38 while the diameter thereof is made larger. That is, the core mold 34 is pressure-inserted into the end of the pipe 12' that is heated and softened. Then, the outer mold 44 is closed such that the socket 16 (FIG. 1) being in a softened state and the heat generating unit 18 are pressure-fitted to each other. When the socket 16 is cured, the outer mold 44 is opened such that the pipe 10 is released from the mold by the projected rods 42.

In addition, in a case where the flow is not interfered by the step formed in the pipeline, it is not necessary to use the spacer 30, and in such a case, a stepped portion between the guide portion 38 and the molding portion 36 of the core mold 34 may be tapered such that the diameter of the pipe 12' can be smoothly enlarged.

Figure 4:
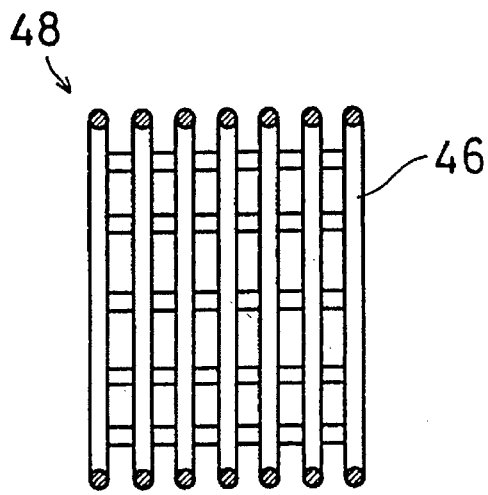
FIG. 4 to FIG. 6 are cross-sectional illustrative views respectively showing modified examples being different from each other of the heat generating unit.
Figure 5:
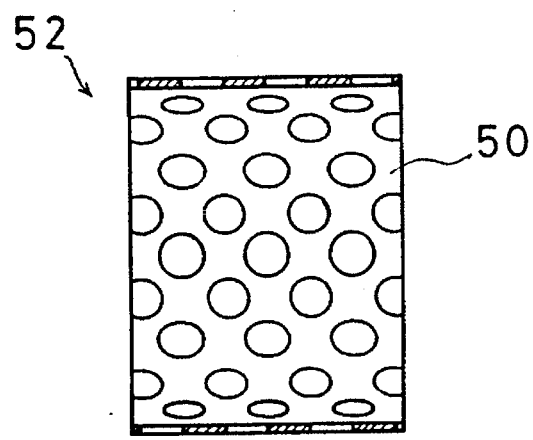
Figure 6:
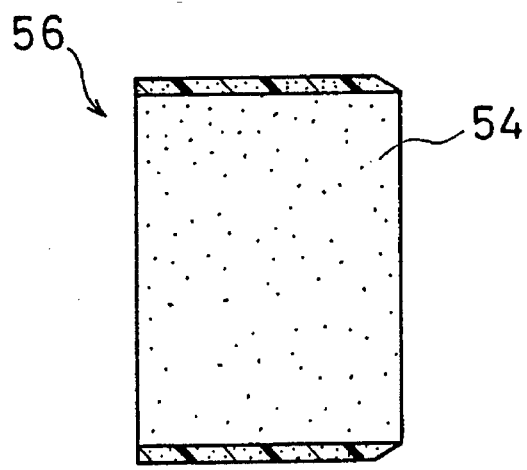
Figure 7:
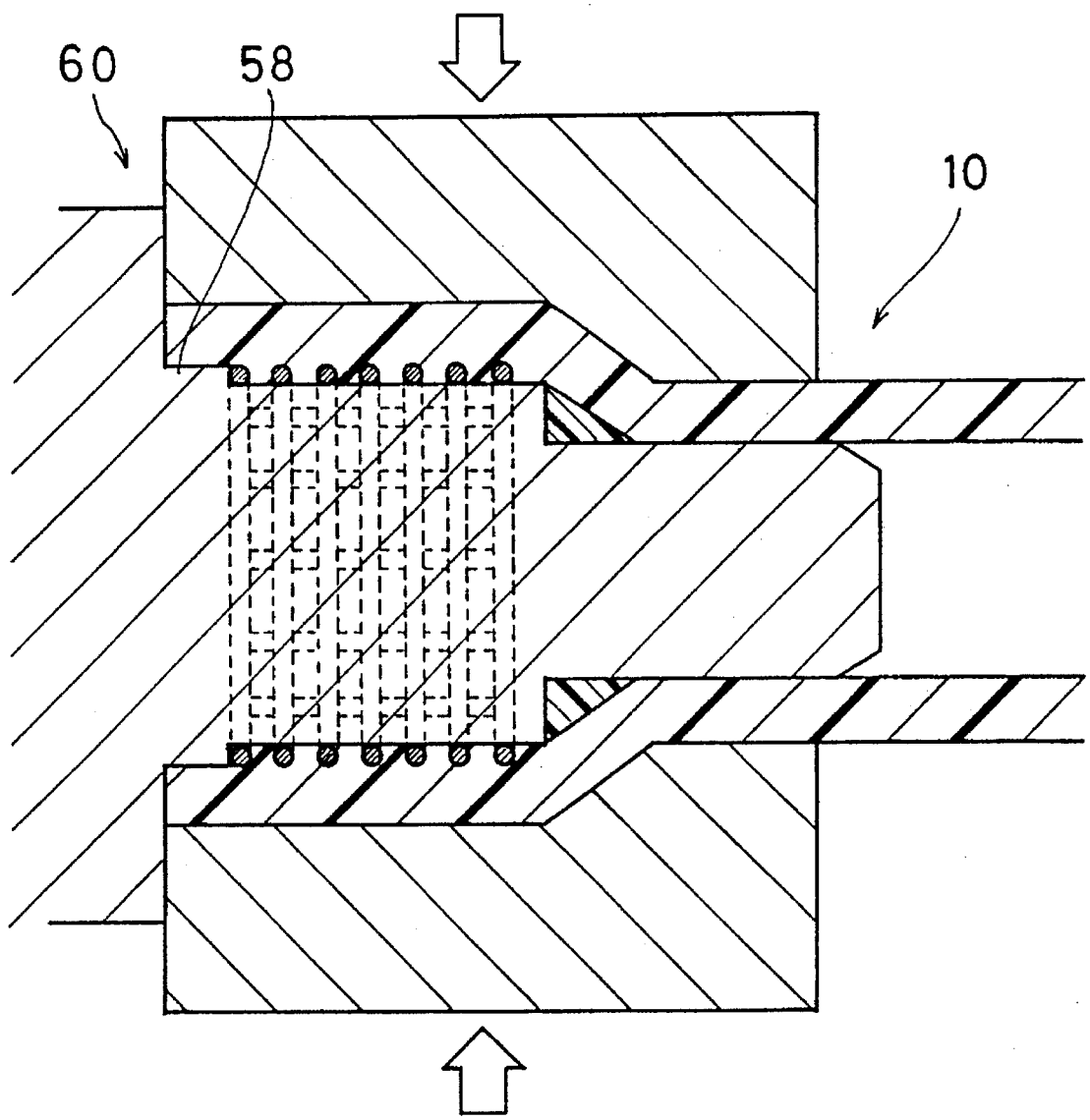
FIG. 7 is an illustrative view showing a manufacturing method of a plastic pipe with use of the heat generating unit shown in FIG. 4.

Furthermore, in the above described plastic pipe 10, the heat generating unit 18 having the coil-like coated electric heating wire 24 is utilized; however, the same may be replaced with a heat generating unit 48 constituted by a mesh-like ferromagnetic alloy member 46 shown in FIG. 4, a heat generating unit 52 constituted by a ferromagnetic alloy member 50 that is formed as a punched metal shown in FIG. 5, or a heat generating unit 56 constituted by a synthetic resin member 54 in which a powder of a ferromagnetic alloy member is mixed shown in FIG. 6. However, each of Curie temperatures of the ferromagnetic alloy members 46 and 50 and the ferromagnetic alloy member powder is set equal to the fusion temperatures of the pipes 12' and 28 or higher than the fusion temperatures. In a case where such the heat generating units 48, 52 or 56 is utilized, a core mold 60 (FIG. 7) having a stopper portion 58 for defining a position at which the heat generating unit is mounted can be utilized.

When a heat generating unit having a rate of openings or holes such as the heat generating unit 48 shown in FIG. 4 or the heat generating unit 52 shown in FIG. 5 is utilized, the wraparound of the synthetic resin of the socket 16 is accelerated through the openings or holes, and therefore, a coupling portion between the heat generating unit and the socket 16 can be surely prevented from being peeled-off.

Figure 8:
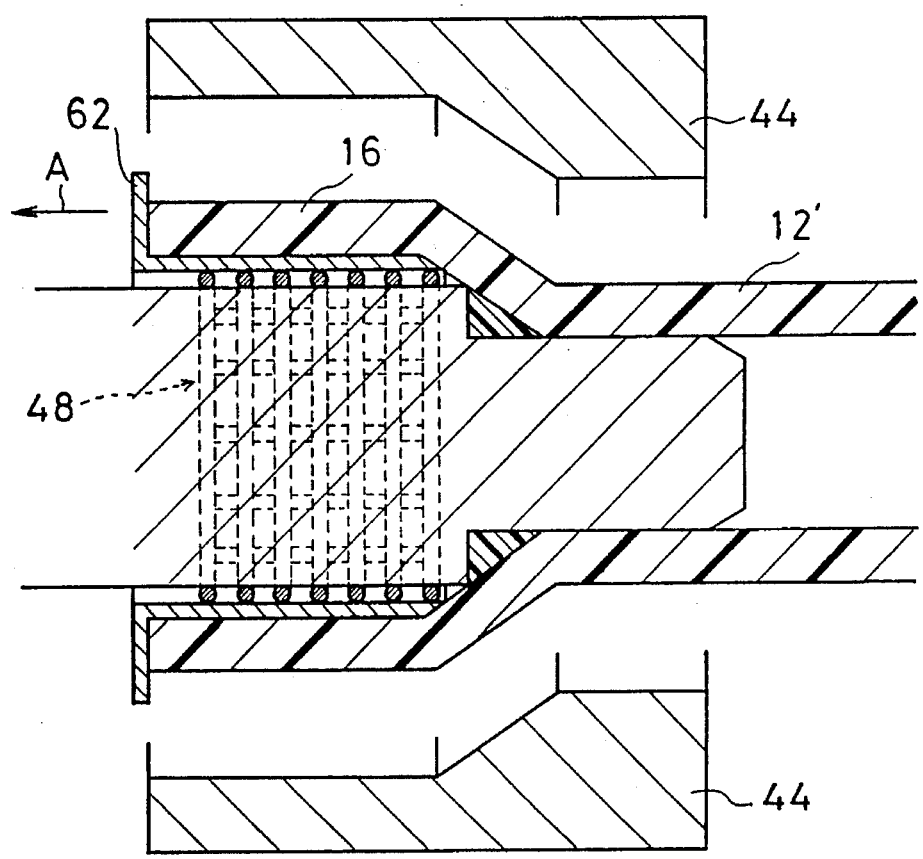
FIG. 8 is an illustrative view showing another manufacturing method of a plastic pipe with use of the heat generating unit shown in FIG. 4.

In addition, if there is a possibility that the tip end of the pipe 12' is caught by the heat generating unit 48 etc. in inserting the core mold 34 into the pipe 12', as shown in FIG. 8, a sleeve 62 for guiding the pipe 12' may be formed on an outer periphery of the heat generating unit 48. In this case, the sleeve 62 is withdrawn in a direction of an arrow mark A after the sleeve 62 is covered by the pipe 12', and thereafter, the outer mold 44 is closed.

Figure 9:
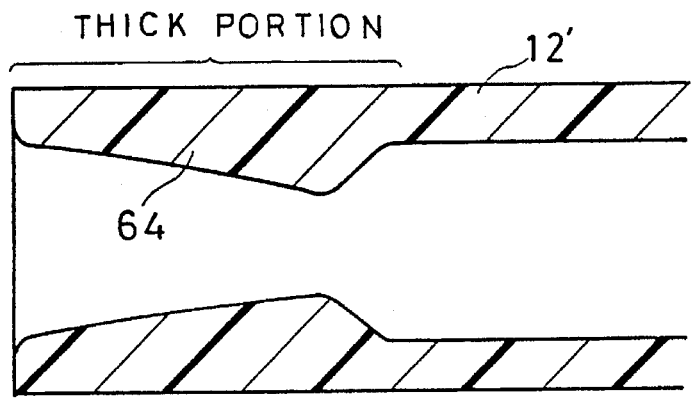
FIG. 9 is a cross-sectional illustrative view showing a modified example of a plastic pipe utilized in FIG. 3 embodiment, FIG. 7 embodiment or FIG. 9 embodiment.

Furthermore, it may be considered that by forming a thick portion 64 at the end of the pipe 12' shown in FIG. 9, or by thickening with force at the end of the pipe 12', a thickness more than a predetermined thickness, that is, a strength more than a predetermined strength is secured at the socket 16.

Figure 10:
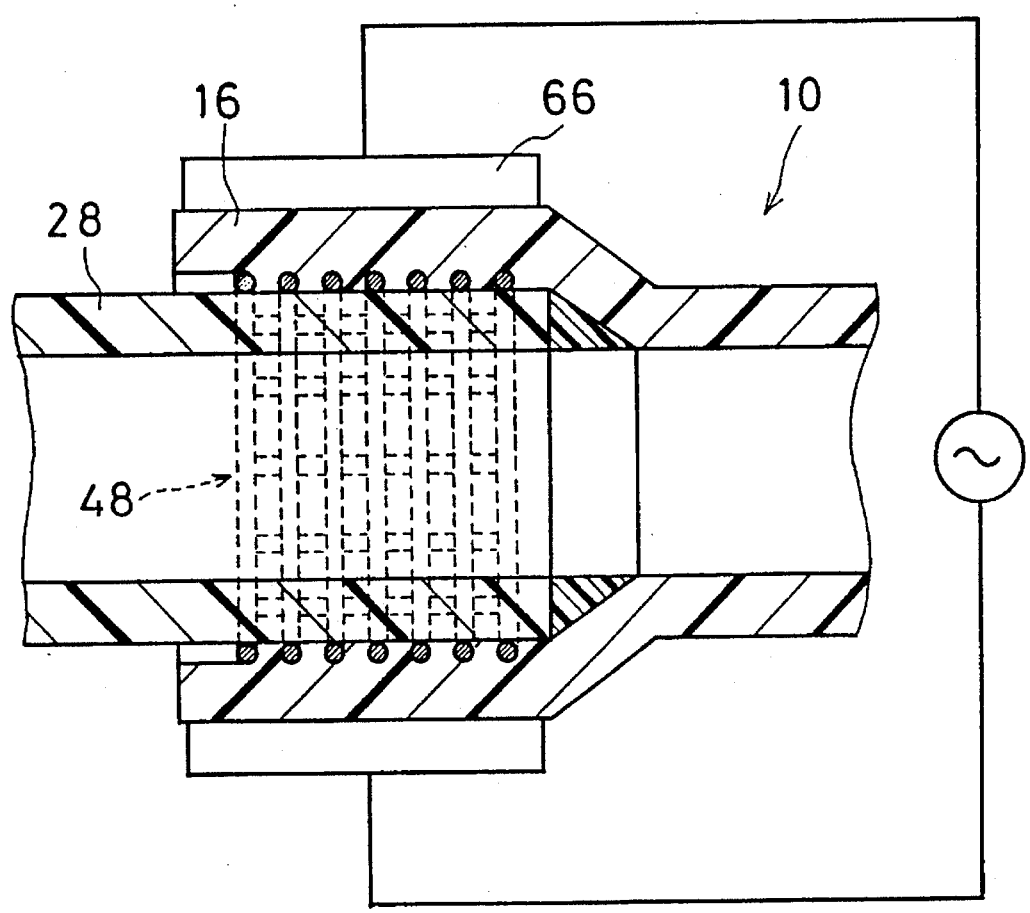
FIG. 10 is an illustrative view showing a method for coupling the plastic pipe with use of the heat generating unit shown in FIG. 4.

With referring to FIG. 10, in coupling the plastic pipe 10 in which the heat generating unit 48 is utilized, an outer periphery of the end of the pipe 28 to be coupled is scraped by a scraper or the like, and the end of the pipe 28 is inserted into the heat generating unit 48, i.e. the socket of the pipe 10. Then, a high-frequency electric power source 66 is arranged around the socket 16, and by utilizing the high-frequency electric power source 66, a high-frequency current is supplied to the ferromagnetic alloy member 46 of the heat generating unit 48 through electromagnetic induction. Then, the current is concentrated at a skin portion of the ferromagnetic alloy member 46 due to a skin effect, and the ferromagnetic alloy member 46 generates a heat rapidly. Thereafter, when a temperature of the ferromagnetic alloy member 46 raises and reaches the Curie temperature, the permeability of the ferromagnetic alloy member 46 suddenly decreases, so that no skin current flows and the heat generated by the ferromagnetic alloy member 46 becomes small. If the temperature of the ferromagnetic alloy member 46 decreases because the heat of the ferromagnetic alloy member 46 is transferred to the socket 16, the pipe 28, and etc., the ferromagnetic alloy member 46 generates a heat again due to the skin current. Therefore, the temperature of the ferromagnetic alloy member 46, i.e. the heat generating unit 48 can be maintained at the Curie temperature or the constant temperature near the Curie temperature, that is, an optimum electro-fusion temperature. Thus, the synthetic resin at a fitted surface between the socket 16 and the pipe 28 and portions in the vicinity of the fitted surface are fused, whereby the both are coupled to each other. In a case where the heat generating unit 52 or 56 is utilized, as similar to the above described case, the plastic pipe 28 and the socket 16 are fused and adhered to each other at the Curie temperature or the predetermined temperature near the Curie temperature.

In addition, as the above described high-frequency electric power source, a high-frequency electric power source disclosed in U.S. Pat. No. 4,769,519 (Sep. 6, 1988) may be utilized. Therefore, the same is incorporated in this specification by quoting the U.S. Pat. No. 4,769,519, and therefore, a detailed description thereof is omitted here.

Figure 11:
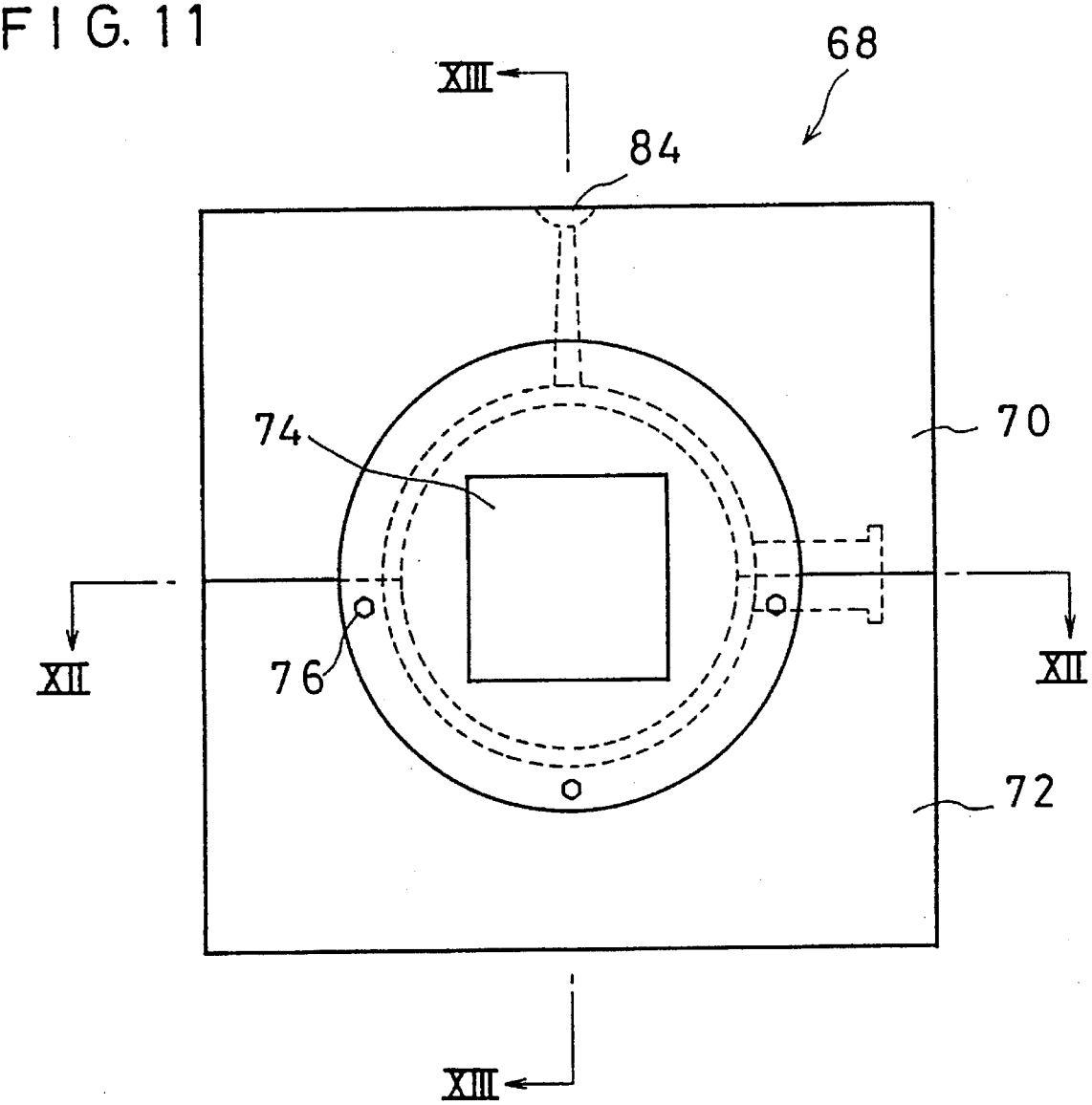
FIG. 11 is an illustrative view showing a mold utilized in a manufacturing method of a plastic pipe according to the present invention.
Figure 12:
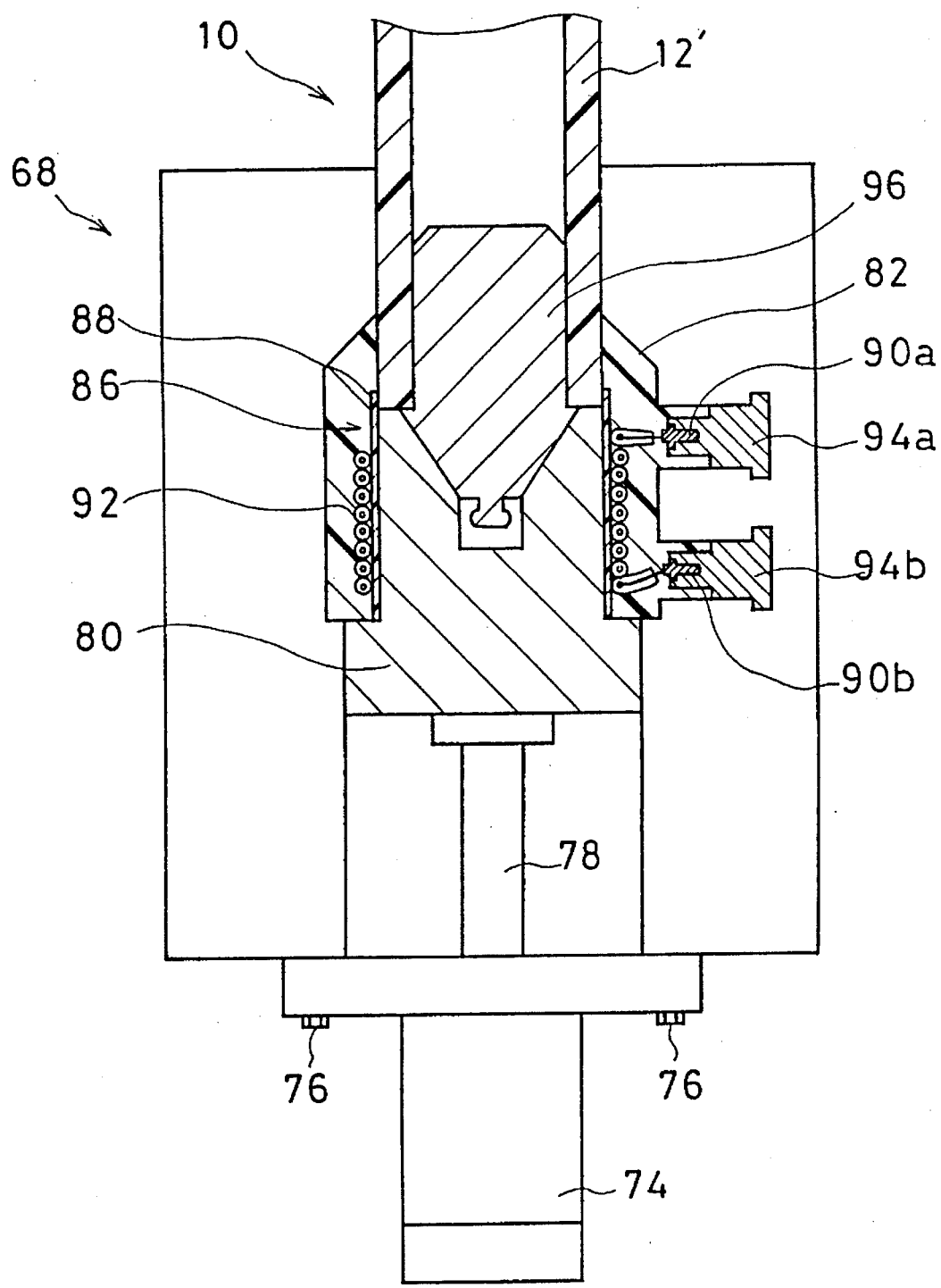
FIG. 12 is a cross-sectional view at a line XII—XII in FIG. 11.
Figure 13:
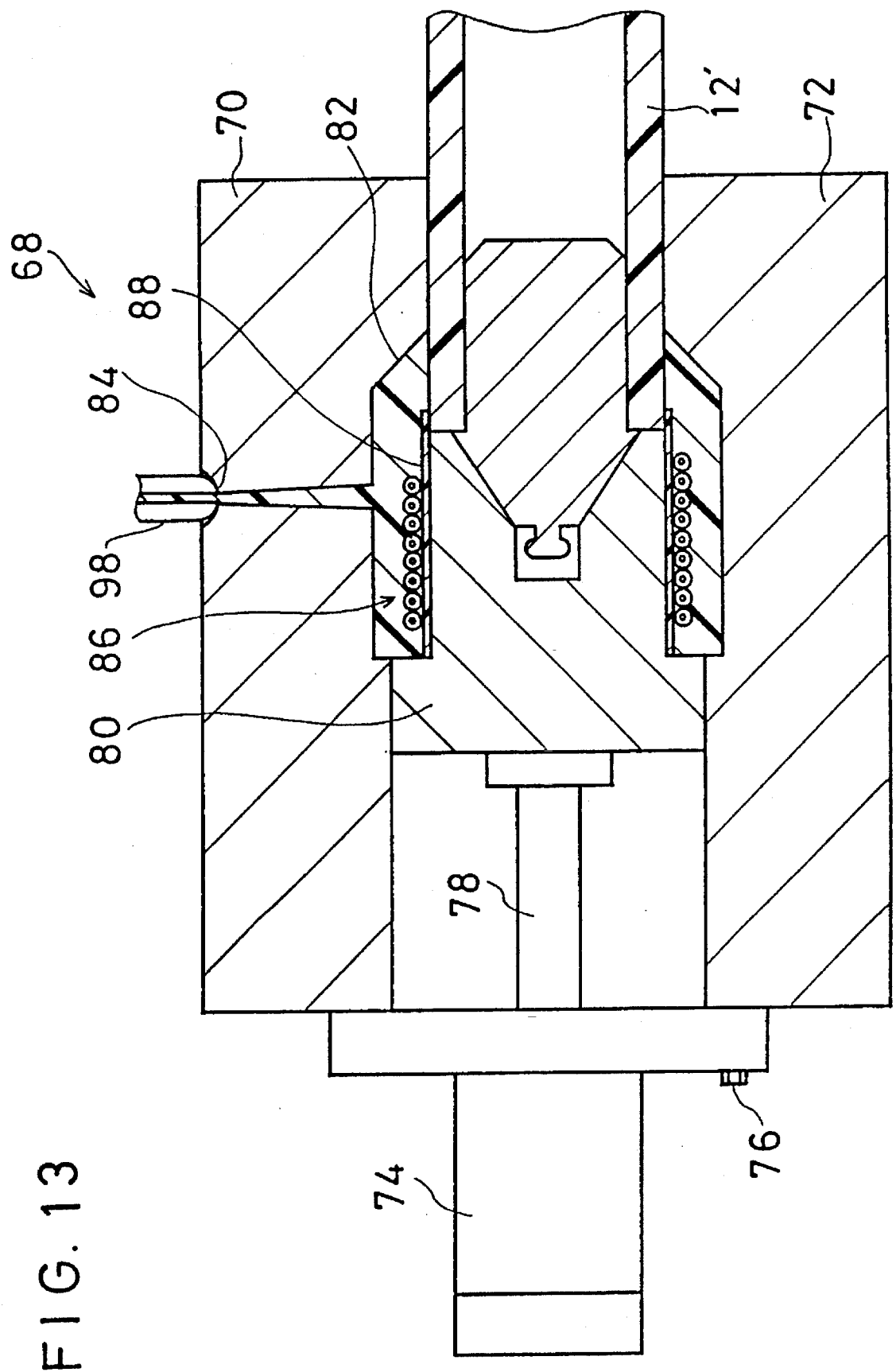
FIG. 13 is a cross-sectional view at a line XIII—XIII in FIG. 11.

In a manufacturing method of a plastic pipe according to another embodiment shown in FIG. 11 to FIG. 13, an injection mold 68 is utilized. The mold 68 includes an upper mold 70 and a lower mold 72 which are opened or closed in an up-down direction, and an oil hydraulic cylinder 74 is attached on a front surface of the lower mold 72 by a bolt 76. Within a space defined by the upper mold 70 and the lower mold 72, a first core mold 80 capable of being slidably moved by a piston 78 which is extended from the oil hydraulic cylinder 74 is arranged. Furthermore, a gate 84 for injecting synthetic resin into a cavity 82 is formed on an upper surface of the upper mold 70.

In manufacturing the plastic pipe 10, at first, a heat generating unit 86 is mounted on the first core mold 80. The heat generating unit 86 includes an approximately hollow cylinder-like mat 88 composed of the same resin material as that of the pipe 12', for example, and on an outer periphery of the mat 88, a coated electric heating wire 92 which is provided with terminals 90a and 90b at both ends thereof are wound. After such the heat generating unit 86 is mounted on the first mold 80, terminal fixing members 94a and 94b are attached to the terminals 90a and 90b, respectively, and the terminal fixing members 94a and 94b are fixed at predetermined positions corresponding to positions at which the terminals 90a and 90b are to be formed. Then, a pipe 12' having an end to which a second core mold 96 is inserted is arranged at a predetermined portion within the mold 68, and then, the upper mold 70 and the lower mold 72 are closed. Thereafter, a nozzle 98 (FIG. 13) of an injection molding machine (not shown) is connected to the gate 84, a synthetic resin material is injected from the nozzle 98 into the cavity 82. After the synthetic resin material is cured, the upper mold 70 and the lower mold 72 are opened, the plastic pipe 10 thus molded is released from the mold 68. In addition, in this manufacturing method, an arbitrary one of the above described heat generating units 18, 48, 52, 56, and etc. can be used, and in a case where the heat generating unit 48, 52 or 56 to which a current is applied through the electromagnetic induction is utilized, it is not necessary to provide the terminal fixing members 94a and 94b.

Figure 14:
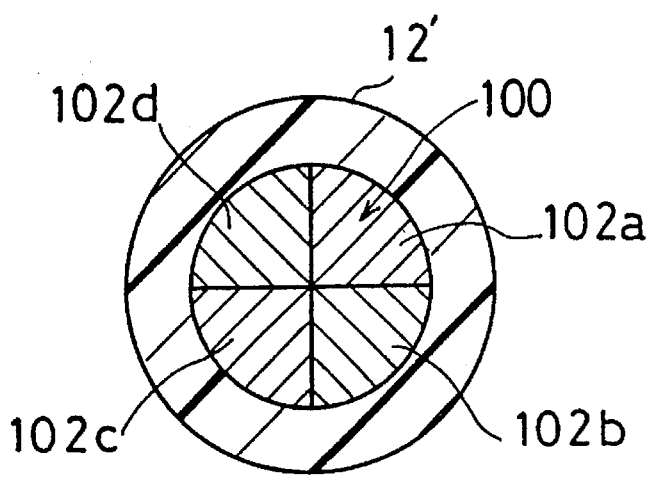
FIG. 14 is a cross-sectional illustrative view showing a state where a collapsible mold is inserted into a pipe in another manufacturing method of a plastic pipe according to the present invention.
Figure 15:
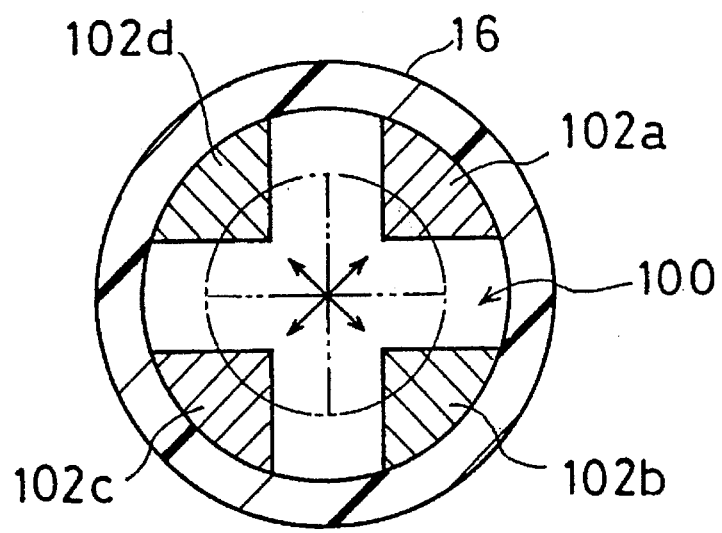
FIG. 15 is a cross-sectional illustrative view showing a state where a diameter of the collapsible mold shown in FIG. 14 is increased.

In a manufacturing method of a plastic pipe according to a further embodiment shown in FIG. 14 and FIG. 15, a collapsible mold 100 is utilized. The collapsible mold 100 includes four mold pieces 102a, 102b, 102c and 102d which can be moved in a diameter direction. Therefore, an outer diameter of the collapsible mold 100 can be made large or small within a predetermined range.

In manufacturing the plastic pipe 10, as shown in FIG. 14, the collapsible mold 100 is inserted into an end of the pipe 12' being heated and softened, and thereafter, as shown in FIG. 15, the diameter of the collapsible mold 100 is made large such that the socket 16 can be formed at the end of the pipe 12'. Then, the collapsible mold 100 is withdrawn from the socket 16, and an arbitrary one of the above described heat generating units 18, 48, 52, 56 and etc. is mounted in the socket 16. Thereafter, the socket 16 is heated and reduced the diameter thereof such that the socket 16 and the heat generating unit can be closely fitted to each other so as to prevent the heat generating unit from being fallen.

Figure 16:
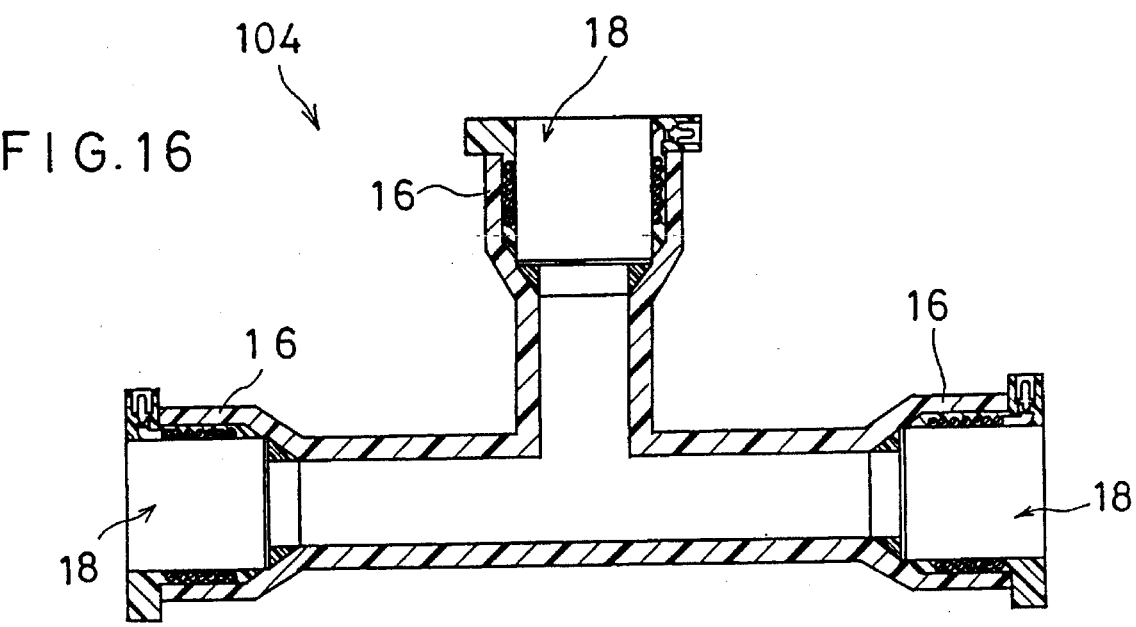
FIG. 16 is a cross-sectional illustrative view showing a plastic pipe according to another embodiment of the present invention.
Figure 17:
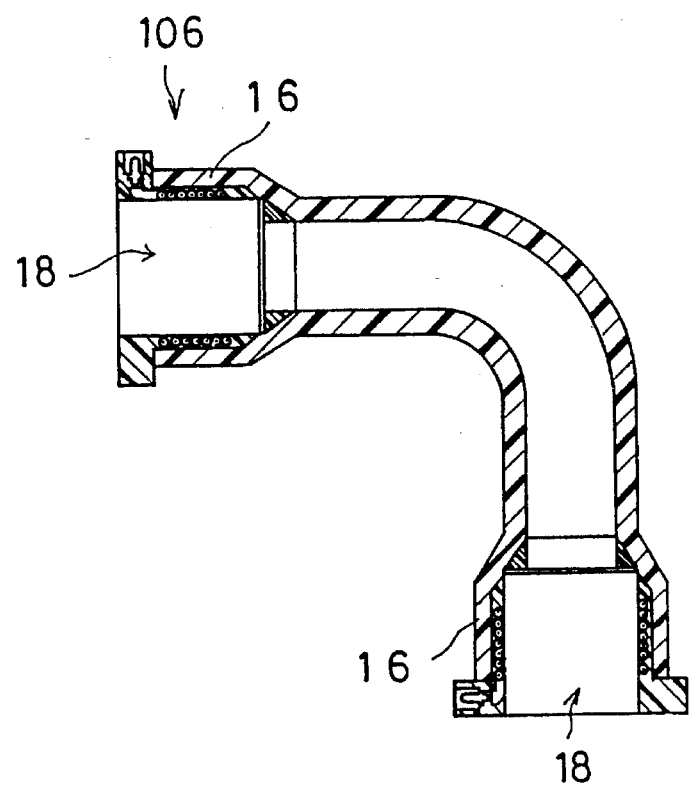
FIG. 17 is a cross-sectional view showing a plastic pipe according to a further embodiment of the present invention.
Figure 18:
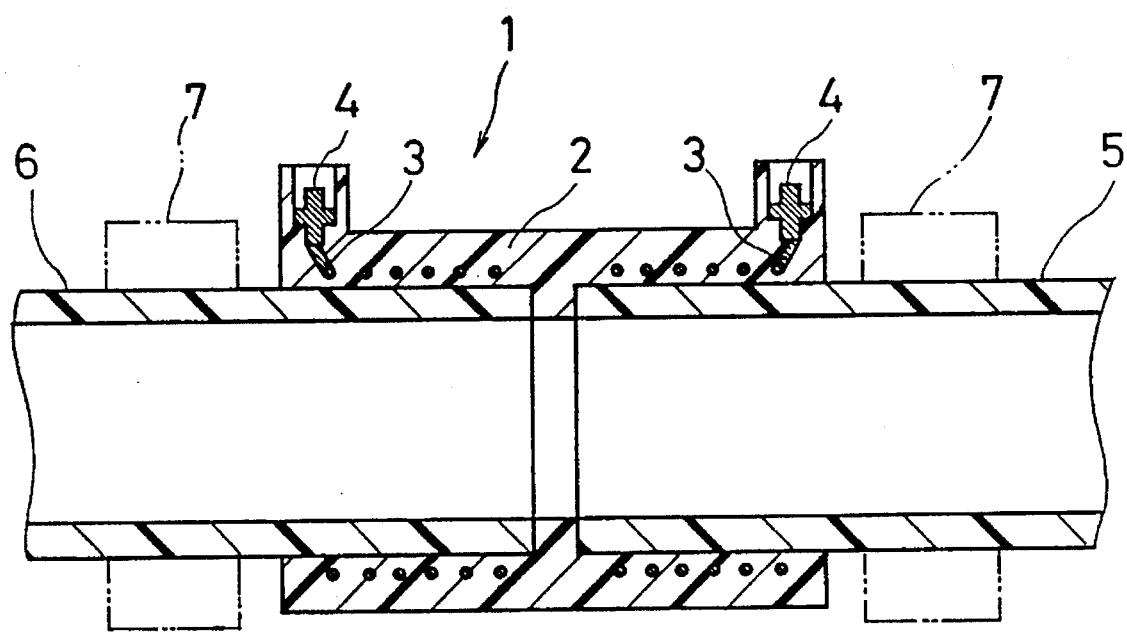
FIG. 18 is an illustrative view showing a prior art.

In addition, in the above described embodiments, the plastic pipe 10 is a straight pipe; however, the plastic pipe 10 may be formed as a tee 104 shown in FIG. 16 or an elbow 106 shown in FIG. 17. The tee 104 shown in FIG. 16 includes sockets 16 at respective ends of an ordinary tee, and heat generating units 18 are mounted in the sockets 16. The elbow 106 shown in FIG. 17 includes sockets 16 at respective ends of an ordinary elbow, and heat generating units 18 are mounted in the sockets 16. In such cases, of course, it is possible to apply an arbitrary one of the above described heat generating units 48, 52, 56, 86, and etc.

We claim:

1. A method of manufacturing a plastic pipe, comprising the following steps:

(a) preparing a pipe formed of a synthetic resin;

(b) preparing a heat generating unit;

(c) mounting the heat generating unit on a core mold;

(d) heating and softening an end of the pipe;

(e) forming a socket at the end of the pipe and incorporating the heat generating unit in the socket by pressure-inserting the core mold into the end of the pipe, said heat generating unit being formed integrally into said socket; and (f) releasing the pipe from the core mold.

2. A manufacturing method according to claim 1, further comprising the steps of:

(c') after step (c) and before step (d), setting a sleeve on said heat generating unit; and (d') after step (d) and before step (e), removing said sleeve from said heat generating unit.

3. A manufacturing method of a plastic pipe, comprising the following steps:

(a) preparing a pipe formed of a synthetic resin;

(b) preparing a heat generating unit;

(c) preparing a first core mold for defining an inner surface of the pipe and a second core mold for defining an inner surface of a socket to be formed on the pipe;

(d) inserting the first and second core molds into the pipe and the heat generating unit;

(e) forming a cavity around the pipe and the heat generating unit by closing an outer mold;

(f) forming the socket to be integrated with the pipe and the heat generating unit by injecting synthetic resin into the cavity; and (g) releasing the pipe from the first and second core molds by opening the outer mold.

4. A manufacturing method according to claim 3, wherein:

said step (c) of preparing a first core mold and a second core mold includes preparing said second core mold with a collapsible portion capable of selectively increasing and decreasing an outside diameter of said second core mold;

said inserting step (d) includes inserting said heat generating unit with said second core mold in a state where said outer diameter of said second core mold has been selectively decreased;

said forming step (f) is performed with said outer diameter of said second core mold in a selectively increased state; and said releasing step (g) includes selectively reducing said outer diameter of said second core mold.

* * * * *